Sept. 3, 1935.  E. W. REYNOLDS  2,013,109
PHOTOPHONOGRAPH
Filed March 31, 1932   2 Sheets-Sheet 1
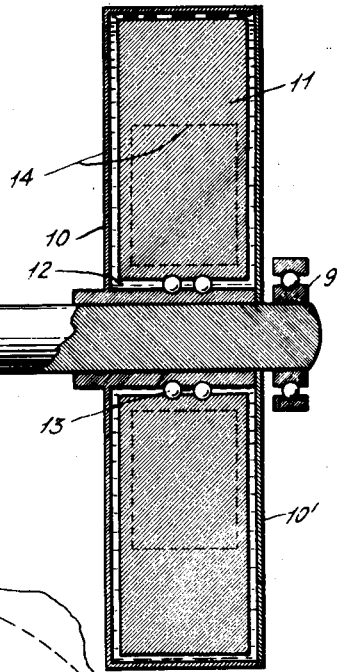
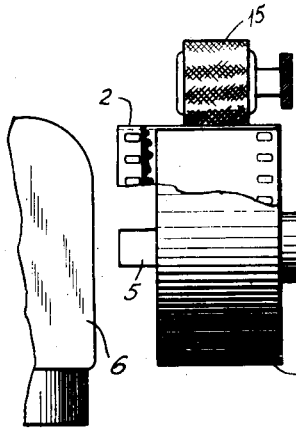
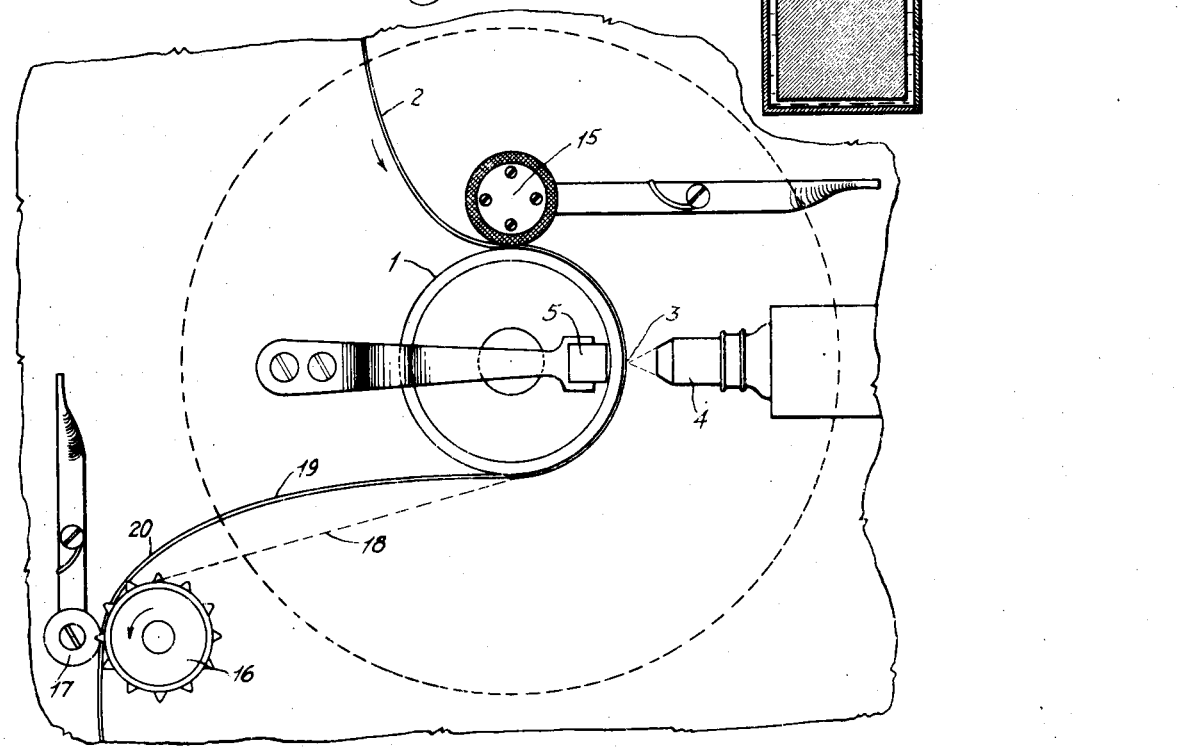
INVENTOR
ELLWOOD W. REYNOLDS
BY
ATTORNEY Sept. 3, 1935.   E. W. REYNOLDS   2,013,109
PHOTOPHONOGRAPH
Filed March 31, 1932   2 Sheets-Sheet 2
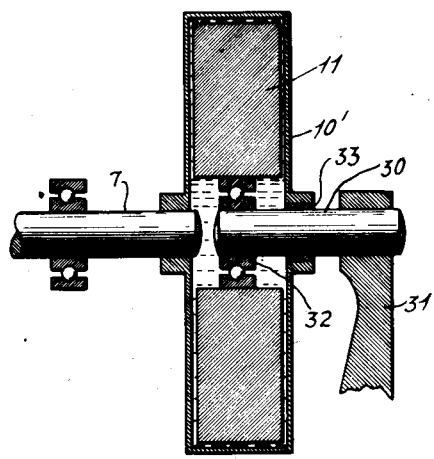
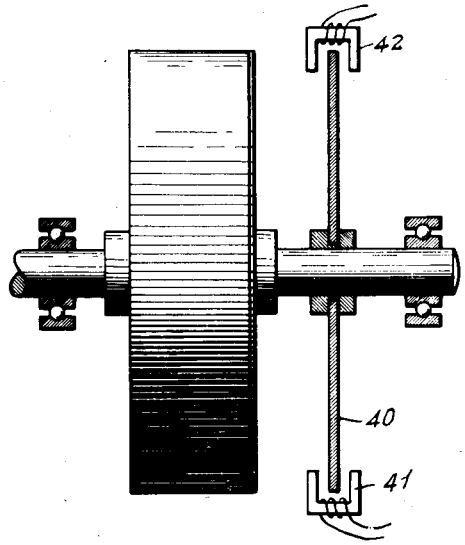
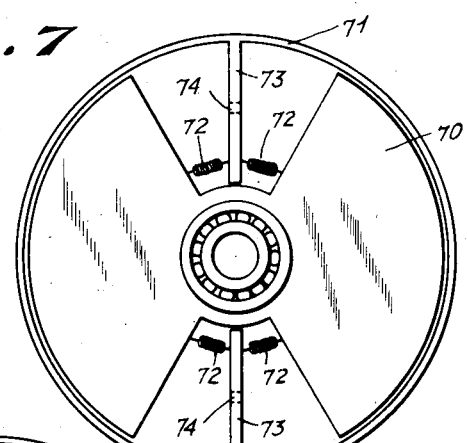
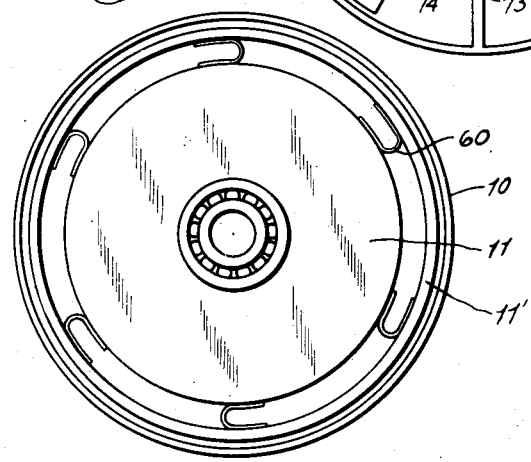
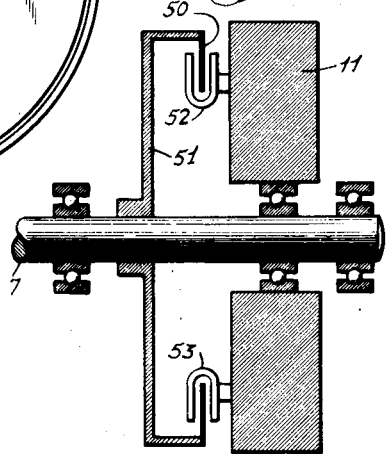
INVENTOR
ELLWOOD W. REYNOLDS
BY
ATTORNEY Patented Sept. 3, 1935

2,013,109

UNITED STATES PATENT OFFICE 2,013,109

PHOTOPHONOGRAPH

Ellwood W. Reynolds, Drexel Hill, Pa., assignor to Radio Corporation of America, a corporation of Delaware Application March 31, 1932, Serial No. 602,274

11 Claims. (Cl. 271—2.3)

This invention relates to film sound reproducers and more particularly to the variety thereof commonly used in conjunction with motion picture machines for the photoelectric reproduction of sound from a photographic soundtrack adjacent one edge of the film, although it is not limited to such apparatus and may be used equally well in sound recording apparatus or printing apparatus. It may be used also with grooved records.

My invention relates particularly to an apparatus for and a method of carrying the film past the reproduction point without any appreciable or noticeable variation in the speed thereof. This is accomplished by keeping the operative portion of the film at all times under the control of a fluid damping-member which serves to damp out any tendency to oscillate, and by providing a loop of film on each side of the reproduction point of such shape that the flatwise elasticity of the film serves to absorb any irregularities in the motion thereof which may tend to be otherwise transmitted to the reproduction point.

One object of the invention is to provide means for moving the film at a perfectly uniform speed past the reproduction point.

Another object of the invention is to provide a construction wherein the flatwise elasticity of the film itself is used to absorb irregularities in the motion thereof.

Another object of the invention is to provide a construction wherein the tension applied to the film is at a minimum.

Another object of the invention is to provide an apparatus wherein the film is carried past the reproduction point upon a drum and is effectively prevented from slipping in relation thereto without the use of any sprocket-teeth upon the said drum.

Another object of the invention is the provision of a novel inertia control member.

Another object of the invention is the provision of means tending to resist any change in velocity of the film in an amount proportionate to the rate of change of velocity.

The foregoing objects are obtained by the construction shown in the accompanying drawings, wherein:

Fig. 1 is a sectional view along the main shaft of the preferred form of my invention;

Fig. 2 is a view from the lefthand side of Fig. 1 showing the optical system and film path;

Fig. 3 illustrates a modified form of fluid damping member which may be substituted for that shown in Fig. 1;

Fig. 4 illustrates the manner in which an eddy current disc may be applied to the construction of Fig. 1 for driving the same;

Fig. 5 illustrates an alternative construction using a magnetic drive to the flywheel instead of the fluid drive;

Fig. 6 illustrates a modified construction of flywheel for correcting for change in viscosity of the fluid; and Fig. 7 illustrates a different variety of damped flywheel for securing prompt acceleration.

Flywheels were long ago proposed for the securing of uniform motion of a film or paper tape in a phonograph or equivalent type of sound reproducer as, for example, in Bell and Tainter Patent 235,496 or in Edison Patent 340,707 and within the limitations of the sound recording at the time of those patents were fairly satisfactory. When photoelectric sound reproduction became practical, due to the commercial availability of thermionic amplifiers, the former limitations of reproducible frequencies were largely removed and it became necessary to provide a correspondingly more accurate control of the film speed at the reproduction point. This was accomplished to a considerable extent by such constructions as that of Cawley Patent 1,825,439 patented September 29, 1931 where the flywheel is driven by the film and the stretch of film intervening between the flywheel and the film driving sprocket itself serves to absorb, due to its elasticity, irregularities in speed which tend to be imparted thereto by the driving sprocket.

Other constructions have also been proposed such, for example, as that illustrated in Vogt Patent 1,713,726 patented May 21, 1929 wherein spring idlers between the flywheel and the driving sprocket are supposed to absorb any irregularities in the film motion, but any such construction necessarily has a period of its own at which the spring idlers and flywheel together form an oscillatory system and, instead of absorbing, may aggravate any periodic errors.

It has been proposed as, for example, in Patent 1,817,758 to damp out oscillations of a rotating member such as a phonograph turntable by means of a viscous fluid, but if a mass is directly connected to the film drum in the type of film phonograph herein considered and such damping is applied to the mass or rotating assembly, any sudden change in speed of drive of the film exerts an undue strain upon the sprocket holes of the film and tends to make it slip over the reproducing drum.

Flywheels have also been proposed for certain purposes wherein the main mass of flywheel was frictionally connected with the rotating member but any such construction is not always satisfactory on account of the difference between static and dynamic friction.

Applicant's construction on the other hand provides no excessive retardation on the starting of the apparatus and at the same time provides accurate control of the movement of the film without any tendency toward oscillation.

The principles involved and the mode of operation will be better understood by reference to Figs. 1 and 2 wherein, 1 indicates a drum adapted to carry the film 2 past the reproduction point 3. An optical system 4 directs a narrow line of light upon the soundtrack of the film at the point 3 and after passing through the film this is reflected by the reflector 5 to the photoelectric cell 6 whence current is amplified and reproduced in the usual manner.

The drum 1 is carried upon a shaft 7 and it should be noted that this shaft 7 is carried on ball-bearings 8 and 9. These ball-bearings are chosen of such a type as to give the least possible friction under the load imposed upon them and as it will appear later, this is an important feature of the invention.

The shaft 7 carries the casing 10 which encloses the flywheel 11 the space therebetween being filled with oil or other fluid indicated at 12. The flywheel 11 is mounted upon ball-bearings 13 so that it runs freely upon the shaft 7 and within the casing 10 and there is no mechanical connection therebetween other than that secured by the oil itself inasmuch as the friction due to the bearing 13 is negligible.

This friction may be reduced to even more closely approach zero by making a considerable portion of the flywheel hollow as indicated by the dotted lines at 14 so that the weight of the wheel is substantially identical with the weight of the oil which it displaces, and the mass is concentrated near the outside edge thereby relieving the ball-bearings of the weight of the flywheels and causing it to maintain its position centrally of the casing.

The entire assembly comprising the drum 1, the shaft 7 and casing 10 is made as light as consistent with good machine work. For example, the casing 10 may be practically a "tin can", being pressed or otherwise formed up and having the cover 10' soldered thereon or fastened in any other equivalent or appropriate manner, and it is immaterial to the construction or operation of the apparatus how the container is formed so long as it maintains a uniform clearance from the flywheel and serves to retain the oil.

As shown in Fig. 2, the film 2 passes downwardly from the let-off reel or the lower sprocket of a motion picture machine and under the pressure roller 15 which maintains it in contact with the surface of the drum 1. The film then passes around the drum and past the reproduction point 3 and on down to the sprocket 16 against which it is held by the pressure roller 17, the film under normal operating conditions assuming the curves shown in Fig. 2.

When the driving power is applied to the apparatus, the sprocket 16 is rotated in a counter-clockwise direction as indicated by the arrow and draws the film down into the position indicated by the dotted lines 18 due to the inertia of the drum 1, shaft 7 and container 10. These are almost immediately accelerated to full operating speed on account of the extremely low frictional resistance of the bearings 8 and 9 and the low mass of the parts 1 and 10. When the film is drawn taut at 18 the upper loop of film of course becomes temporarily enlarged. Since the container 10 has been almost instantly brought up to full speed it rotates the body of oil therein, and thereby, due to the viscosity of the oil, applies a torque to the flywheel 11 and, overcoming its inertia, causes it to gradually assume the same speed as the rotating container 10. If the clearances between the flywheel and container are chosen for proper operation with ordinary 35 mm. sound motion picture film and the viscosity of the oil is correspondingly chosen, it will take from 5 to 10 seconds for the flywheel 11 to reach the same speed as the container 10 and during this period the lower loop of the film will gradually rise from the position shown by the dotted line 18 to the position shown at 19, when a flatwise elasticity of the portion of the film indicated at 20 will be sufficient to overcome the friction of the ball-bearings 8 and 9 and to rotate the entire assembly. The upper loop of film will be drawn to a position where its elasticity is in equilibrium with the elasticity of the film at 20 and the resistance due to the bearings 8 and 9 and, so long as the sprocket 16 is driven at a uniform speed this condition will persist. If, however, there is a change in the speed of the sprocket 16 or if there are irregularities in the sprocket teeth or in the perforations, the loop of film 19, 20 will be lengthened or shortened, since the viscous coupling between the flywheel 11 and the casing 10 is sufficient to resist materially any sudden change in speed of the casing 10; and this resistance is large compared to the force required to bend the film flatwise at 20.

It will be obvious that the loop of film at 20 can take up a sudden variation in movement of great magnitude without materially changing the rotational speed of the drum 1.

Fig. 3 shows a modified form of flywheel which may be substituted for that shown in Fig. 1 and avoids the carrying of the weight of the flywheel upon the ball-bearings supporting the film drum itself thereby permitting the ball-bearings to be very much lighter. In this figure flywheel 11 is supported upon a stub shaft 30 carried by a fixed bracket 31, the ball-bearing 32 being fixed upon this stationary shaft 30 and supporting the entire weight of the flywheel. The casing cover 10' is in this case provided with an appropriately oil-tight joint 33 for preventing leakage of the oil from the rotating case where it meets the shaft 30.

In Fig. 4 there is shown an eddy-current disc 40 which is driven by magnets 41 and 42 actuated by an alternating current in the usual manner, and this provides a sufficient rotative force to overcome even the slight friction of the ball-bearings, thereby permitting the loops of the film to be much larger and to carry only sufficient tension to determine the average speed at which the drum rotates.

Fig. 5 shows a modified construction wherein an eddy-current disc 50 is mounted upon the shaft 7 by an appropriate member 51 and cooperates with magnets 52 and 53, of which there may be any desired number, upon the flywheel 11. In this case any relative movement of the conductive disc 50 and the magnets 52 etc. produces eddy-currents in this member 50 tending to oppose such movement in a manner similar to the action of the oil in Fig. 1 and this opposition to relative movement is proportional to the velocity of such movement. This construction therefore will operate in a manner similar to that of the device of Fig. 1 and has an advantage in that its operation is independent of temperature and there is no possibility of oil leakage. On the other hand, the magnetic arrangement is somewhat more expensive to construct than the container of Fig. 1.

Fig. 6 shows a modified form of flywheel which is designed to compensate for changes of either clearance or of viscosity due to temperature. In this case the body 11 of the flywheel is provided with a rim 11', described in more detail hereinafter, and this rim is connected to 11 by yieldable members such as springs 60. The clearance between the periphery of the rim 11' and the casing 10 is normally the same as that shown in Fig. 1 and in this form the casing is likewise filled with oil.

The rim 11' may be made of thermo-metal, as is the balance within a watch for example, and may be separated so that the portions thereof can advance toward or recede from the casing 10 on change of temperature as does the rim of a balance-wheel, thereby compensating for change in viscosity of the oil. An alternative form of this construction is to make the casing 10 of a material such, for example, as steel, which has a relatively low coefficient of thermal-expansion, and to make the rim of 11' of different material, such for example as brass or aluminum, which has a relatively high co-efficient of expansion. In this case any increase in temperature of the entire assembly, which would tend to decrease the viscosity of the oil, will at the same time cause an expansion of the rim 11' which is greater than the expansion of the periphery of the casing 10 and the clearance between these members will thereby be decreased. By choice of materials having appropriate relative expansions, and the appropriate relation of these expansions to the clearance and to the change of viscosity of the oil with temperature, the coupling between the casing 10 and the flywheel may be made constant or, if desired, it may even be over-corrected to also compensate for change in viscosity of the lubricant in the ball-bearings although this latter is a refinement not commercially necessary at present.

Fig. 7 shows a modified construction wherein the flywheel 70 is fixed yieldably relatively to the case 71 by the springs 72, which tend to hold the partitions 73 in the middle of the V-shaped notches in the rim of the flywheel. These partitions extend substantially to the hub of the flywheel, i. e. to the base of the V-shaped notches, and through the entire thickness of the casing from bottom to cover. The space is, as in Fig. 1, entirely filled with oil. The partitions are provided with apertures 74 through which the oil must pass if there is any relative movement of the flywheel 70 and the casing 71 and, since the movement of the oil through the apertures is dependent upon its viscosity, this construction will function in the same manner as that shown in Fig. 1 except that a much more rigid effective coupling between the flywheel and the casing will be maintained, and this construction will be therefore found primarily of value where relatively great changes in speed at relatively high frequencies are to be absorbed or prevented rather than in a construction having the film arrangement shown in Fig. 2 where the changes are low both in magnitude and period.

By the term "viscous" in the following claims, I refer to any connection or material having the same operative result as does the oil in Fig. 1 as, for example, the magnetic coupling in Fig. 5.

It will be apparent that I have provided a new and useful means for securing a perfectly uniform speed of movement of a light record carrier, and that I have also provided a number of modifications thereof particularly applicable to special circumstances, wherefore I claim:

1. Means for causing an elastic film to travel past a predetermined point at a uniform velocity consisting of a rotary member for supporting the film at the said point, means for drawing the film over the rotary member, means for maintaining the film curved in a free loop between the first two means, a flywheel freely independently rotatable, and means for yieldably and aperiodically coupling the flywheel to the said supporting member whereby said film alone absorbs irregularities of motion imparted thereto by said drawing means.

2. Means for causing an elastic film to travel past a predetermined point at a uniform velocity consisting of a rotary member for supporting the film at the said point, means for drawing the film over the rotary member, means for maintaining the film curved in a free loop between the first two means, a flywheel freely independently rotatable, and means for yieldably and aperiodically coupling the flywheel to the said supporting member, said supporting member rotating substantially without friction whereby the flatwise elasticity of the said loop is sufficient to cause rotation thereof whereby said film alone absorbs irregularities of motion imparted thereto by said drawing means.

3. Photophonographic means consisting of a drum adapted to carry a film past a reproduction point with the soundtrack of the film overhanging the edge thereof, means for maintaining the film in cooperative relation with the said drum with a free loop of film at each side thereof, a flywheel coaxial with the said drum and rotatable independently thereof, and viscous means connecting the said flywheel and the said drum whereby said film alone absorbs irregularities of motion imparted thereto by said drawing means.

4. Photophonographic apparatus consisting of a rotatable member carrying the film past an operational point, means for providing a free loop of film under slight flatwise tension at each side of said rotatable member for controlling the speed of rotation of said member and for absorbing irregularities of motion imparted to the said film, the said rotatable member being mounted upon substantially frictionless bearings, and momentum means viscously coupled to the said rotatable member whereby said film alone absorbs irregularities of motion imparted thereto by said drawing means.

5. Photophonographic apparatus consisting of rotatable member carrying the film past an operational point and means for providing a free loop of film under slight flatwise tension at each side of said rotatable member for controlling the speed of rotation of said member and for absorbing irregularities of motion imparted to the said film, the said rotatable member being mounted upon substantially frictionless bearings, and momentum means viscously coupled to the said rotatable member, said momentum means being otherwise freely rotatable whereby said film alone absorbs irregularities of motion imparted thereto by said drawing means.

6. Means for causing an elastic film to travel past a predetermined point at a uniform velocity comprising a rotary member for supporting the film at the said point, means for drawing the film over the rotary member, means for maintaining the film curved in a free loop between the first two means, a flywheel freely independently rotatable, viscous means yieldably and aperiodically coupling the flywheel to the said supporting member, and means for compensating for changes in viscosity due to change in temperature of the viscous means.

7. Means for causing an elastic film to travel past a predetermined point at a uniform velocity comprising a rotary member for supporting the film at the said point means for drawing the film over the rotary member, means for maintaining the film curved in a free loop between the first two means, a flywheel freely independently rotatable upon the shaft of said rotary member, and consisting of a fluid-filled container rigidly connected to said rotary member and enclosing the flywheel for yieldably and aperiodically coupling the flywheel to the said supporting member.

8. Photophonographic means comprising a drum adapted to carry a film past a reproduction point with the soundtrack of the film overhanging the edge thereof, means for maintaining the film in cooperative relation with the said drum with a free loop of film at each side thereof, a flywheel co-axial with the said drum and rotatable independently thereof, viscous means connecting the said flywheel and the said drum, and means for compensating for changes in the viscosity of said viscous means.

9. Means for causing an elastic film to travel past a predetermined point at a uniform velocity comprising a rotary member for supporting the film at the said point, means for drawing the film over the rotary member, means for maintaining the film curved in a free loop between the first two means, a flywheel co-axial with said rotary member and freely rotatable independently thereof, means for yieldably and aperiodically coupling the flywheel to the said supporting member, and means for independently supporting said flywheel.

10. Means for causing an elastic film to travel past a predetermined point at a uniform velocity comprising a rotary member for supporting the film at the said point, means for drawing the film over the rotary member, and means for maintaining the film curved in a free loop between the first two means, a flywheel freely independently rotatable upon the shaft of said rotary member and consisting of a fluid-filled container rigidly connected to said rotary member and enclosing the flywheel for yieldably and aperiodically coupling the flywheel to the said supporting member, the said flywheel being hollow, whereby at least a portion of its weight is carried by said fluid.

11. Means for causing an elastic film to travel at a uniform velocity consisting of a path defining member in co-operative relation with said film, means for moving the film through said path, means for maintaining the film curved in a free loop between said member and said means, a flywheel freely independently rotatable, and means for yieldably and aperiodically coupling the flywheel to the said film whereby said film alone absorbs irregularities of motion imparted thereto by said drawing means.

ELLWOOD W. REYNOLDS.